United States Patent
Broderick et al.

(10) Patent No.: US 7,198,684 B2
(45) Date of Patent: Apr. 3, 2007

(54) METHOD FOR MANUFACTURING ARTICLES USING A SEMI-CONTINUOUS FLOW OF WORKPIECES THROUGH METAL WORKING AND ANNEALING APPARATUS

(75) Inventors: Thomas Froats Broderick, Springboro, OH (US); Jeffrey Lynn Myers, West Chester, OH (US); Francois Laurent Giguere, Granby (CA); Peter Brian Haley, Bow, NH (US); Paul Raymond Phaneuf, Manchester, NH (US); William Francis Bergeron, Hooksett, NH (US); Thomas Caudwell Straub, Harnstead, NH (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 10/388,671

(22) Filed: Mar. 14, 2003

(65) Prior Publication Data
US 2004/0177906 A1    Sep. 16, 2004

(51) Int. Cl.
*C21D 8/00* (2006.01)
(52) U.S. Cl. .................... 148/677; 148/676; 148/556; 148/559; 266/103

(58) Field of Classification Search ................ 266/105, 266/556, 676, 677, 656, 651, 426–429, 102, 266/103; 148/426
See application file for complete search history.

(56) References Cited

U.S. PATENT DOCUMENTS

| | | | |
|---|---|---|---|
| 3,988,913 A | | 11/1976 | Metcalf et al. |
| 4,321,097 A | * | 3/1982 | Kerr ........................... 148/239 |
| 4,857,696 A | | 8/1989 | Taeusch et al. |
| 4,888,863 A | | 12/1989 | Cox et al. |
| 5,242,156 A | * | 9/1993 | Kay ........................... 266/105 |
| 5,424,156 A | * | 6/1995 | Aoki et al. ................. 430/58.4 |
| 5,800,774 A | * | 9/1998 | Willett ....................... 266/105 |

FOREIGN PATENT DOCUMENTS

JP         362180049    *    8/1987    ................. 148/540

* cited by examiner

*Primary Examiner*—Deborah Yee
(74) *Attorney, Agent, or Firm*—McNees Wallace & Nurick LLC (57) ABSTRACT

A plurality of gas turbine components or other articles are manufactured from a plurality of metallic-alloy workpieces using a manufacturing apparatus having a metalworking apparatus, and an annealing apparatus wherein the individual workpieces are annealed by single-workpiece annealing and not by large-batch annealing. A workpiece flow of the plurality of workpieces is established sequentially through the metalworking apparatus and the annealing apparatus.

23 Claims, 4 Drawing Sheets

METHOD FOR MANUFACTURING ARTICLES USING A SEMI-CONTINUOUS FLOW OF WORKPIECES THROUGH METAL WORKING AND ANNEALING APPARATUS

This invention relates to manufacturing technology, and more particularly to a method for manufacturing articles that require metalworking and intermediate annealing between metalworking steps.

BACKGROUND OF THE INVENTION

Some types of articles require a sequence of multiple metalworking steps and intermediate annealing steps during the manufacturing operation. For example, some gas turbine components are mechanically worked by rolling to the required configuration, thickness, and metallurgical structure from a starting workpiece. Specific gas turbine components manufactured in this manner include the airfoil portion of some types of wrought high-pressure compressor blades and vanes, and the rings used to produce the ring segments that form the inner and outer bands of segmented compressor vane structures. These components are made of nickel-base alloys selected to have the required mechanical performance at the operating temperature of the components.

The rolling from the starting workpiece to the required final configuration, thickness, and metallurgical structure cannot be accomplished in a single rolling operation because of metallurgical limitations. The workpiece work hardens during the rolling operation so that eventually its strength becomes too high and its ductility becomes too low for further rolling. At that point, it is solution annealed to soften the metal. The solution annealing temperature for the nickel-base alloys is usually about 1800–1900° F. in order to achieve the desired softening of the metal for available nickel-base alloys. The solution annealing is typically performed in a vacuum oven because the nickel-base alloys oxidize badly if annealed in air or even in commercial-quality nitrogen or inert gases at this required annealing temperature and for the times required to achieve the annealing.

After the solution annealing is complete, the annealed workpiece is further mechanically worked by additional rolling toward the required final configuration and thickness. The workpiece again work hardens, and may again require annealing before further rolling. Typically several sequences of rolling and solution annealing are required to achieve the desired final configuration.

This approach works well and has been used successfully for many years. However, there is a desire and a need to improve the economics by reducing the manufacturing costs. Any change in the manufacturing procedures must not cause a reduction in the quality of the finished articles. The present invention fulfills this need, and further provides related advantages.

SUMMARY OF THE INVENTION

The present approach provides a manufacturing method for producing articles that require a combination of metalworking and intermediate annealing to permit further metalworking. The approach reduces costs by achieving a better flow of the workpieces through the manufacturing operation. The required configuration, thickness, and metallurgical structure, and thence quality, of the article is achieved.

A method for manufacturing a plurality of gas turbine component articles from a plurality of metallic-alloy workpieces includes providing a plurality of workpieces. The workpieces are substantially identical and preferably are selected from the group consisting of a gas turbine compressor blade workpiece, a gas turbine compressor vane workpiece, and a gas turbine compressor-vane ring workpiece. A manufacturing apparatus is provided comprising a metalworking apparatus such as a rolling apparatus, and an annealing apparatus wherein the workpieces are annealed by single-workpiece annealing and not by large-batch annealing. A workpiece flow of the plurality of workpieces sequentially through the metalworking apparatus and the annealing apparatus is established.

A major cause of the manufacturing inefficiencies of the prior approaches has been the use of large-batch annealing ovens. To perform the annealing operation by the conventional approach, a sufficient number of the articles to be annealed is gathered together to make an oven load. The articles are loaded into a vacuum oven when one becomes available. The vacuum ovens are large, expensive pieces of equipment, and are usually located at a central heat-treating facility so that they may be utilized most efficiently by keeping them in operation as much as possible. Consequently, there is usually a waiting time until other jobs are finished. After an oven-load of the articles is transported to the central heat-treating facility, the vacuum oven becomes available, and the articles are loaded into the vacuum oven, the vacuum oven is evacuated, and then the oven is heated to the annealing temperature. For nickel-base alloys, the required annealing temperature is typically at least about 1750° F., and often as high as about 1800–1900° F. After the articles are annealed, the oven is cooled, the vacuum is broken, and the articles are removed. They then are rolled again in another set of rolling passes. The annealing process is thereafter repeated.

The complete annealing-oven cycle typically takes at least about 3–4 hours to perform, with the articles nominally at the annealing temperature for at least about 1 hour of that time. An annealing "cycle" includes the vacuum pumpdown, heating to the anneal temperature, time at the annealing temperature, and cooldown to accomplish a single annealing of the article. However, the time required for the actual annealing cycle is typically relatively only a small part of the total period between the time that the articles leave the metalworking facility for transport to the heat-treating facility, and the time when the annealed articles arrive back at the metalworking facility for further metalworking. This total time is often several days. There may be, and usually is, an annealing cycle between each progressive increment of the metalworking process, so that the delays are experienced between each metalworking increment. When the time per annealing cycle is multiplied by the number of annealing cycles that are often required, five or more, the time required to complete the manufacturing of each article may be two weeks or more.

The long annealing oven cycle time arises due to heat-flow-rate limitations. In the large-batch oven the cycle must be sufficiently long to be certain that all of the articles reach the annealing temperature. The articles are usually placed in baskets together inside the vacuum oven, so that the outermost articles closest to the walls of the vacuum oven heat most rapidly, and gradually the innermost articles reach the annealing temperature. Even after the nominal oven wall temperature initially reaches the annealing temperature, the innermost articles are typically far below the annealing temperature. Sufficient time must be allowed for all of the articles to equilibrate at the annealing temperature.

The inventors have determined that, metallurgically, typical nickel-base alloys are sufficiently annealed to permit further rolling in less than 2 minutes, often in less than about 30 seconds, once they reach the annealing temperature. Thus, in the present approach, the individual articles made of such alloys are heated to the annealing temperature as rapidly as the surface heat transfer rate and thermal diffusivity of the metal allows, termed single-workpiece annealing, rather than relying on the temperature equilibration of a large number of the articles inside a batch-annealing vacuum oven. The articles may be heated individually, or in small batches wherein each article is individually heated as though it were the only article being heated. Thus, it is preferred to provide the annealing apparatus wherein each workpiece is heated to the annealing temperature in a time that is substantially no greater than a time required to heat a single workpiece to the annealing temperature by the selected heating method.

When the articles are heated in this manner, they are at the annealing temperature for such a short time that they do not have time to oxidize to the extent that the ability to further process them is lost. The annealing may therefore be performed in air or a commercial non-oxidizing gas that may have some small amount of oxygen in it, and at one-atmosphere (atmospheric) pressure. The expensive vacuum ovens with their long cycle times are not required, thereby significantly reducing the capital and operating costs associated with the annealing. Instead, relatively inexpensive non-vacuum ovens or other heating apparatus are used, and the articles are in the non-vacuum ovens for such a short time that the ovens may be made quite compact. Heating sources such as resistance-radiant heating, induction heating, direct electrical-resistance heating of the articles, radiant heating with lamps, or infrared heating may be used. For the nickel-base and many other alloys, each workpiece is heated in the annealing apparatus to the annealing temperature for a time of no more than about 5 minutes, more preferably no more than about 2 minutes, and most preferably no more than about 30 seconds. Each workpiece remains in the annealing apparatus relatively briefly, usually no more than about 30 minutes, more preferably no more than about 15 minutes, and most preferably no more than about 10 minutes, a time that is much less than that required for a large-batch process that achieves the same result.

The present approach has another important advantage. With the large-batch-annealing process, if some problem arises such as a metalworking process error, an air leak into the vacuum oven, or an incorrect temperature of the vacuum oven, an entire batch of the articles may be ruined before the problem can be discovered and corrected. It may take as much as two weeks to complete the full manufacturing operation and discover the problem, during which time many more articles passing through the manufacturing operation may be damaged as a result of the as-of-then undiscovered problem. With the present approach, any manufacturing problems are discovered much more quickly because each article typically moves from the beginning of the manufacturing flow to the end in a nearly continuous manner requiring at most a few hours, termed "semi-continuous" herein.

In most cases multiple steps of metalworking and annealing are required. For example, the manufacturing apparatus may have a first metalworking subapparatus, a first annealing subapparatus, and a second metalworking subapparatus. The step of establishing includes the step of establishing the workpiece flow sequentially through the first metalworking subapparatus, thereafter through the first annealing subapparatus, and thereafter through the second metalworking subapparatus. Extending this concept, the manufacturing apparatus may additionally have a second annealing subapparatus, and a third metalworking subapparatus. In this case, the sequential workpiece flow is through the first metalworking subapparatus, thereafter through the first annealing subapparatus, thereafter through the second metalworking subapparatus, thereafter through the second annealing subapparatus, and thereafter through the third metalworking subapparatus. The various pieces of subapparatus may be arranged in a variety of ways, and some examples will be presented subsequently.

In another embodiment, a method for manufacturing a plurality of articles from a plurality of metallic-alloy workpieces comprises the step of providing a plurality of workpieces, wherein the workpieces are substantially identical and are made of a workpiece material that requires post-metalworking annealing at a annealing temperature of at least about 1700° F. and, if heated to a temperature of more than about 1750° F. for a time of greater than about 1 hour (2 hours in some cases) in air, is unacceptably oxidized so as to be rendered inoperable for metalworking. Many nickel-base alloys and superalloys are in this class. A workpiece flow of the plurality of workpieces is established sequentially through the metalworking apparatus and the annealing apparatus, wherein the workpieces are heated to the annealing temperature of at least about 1750° F. for a time of no more than about 2 minutes. Other compatible features and embodiments discussed herein may be used with this approach.

The absolute thickness dimension of the articles may play an important role. A thick article takes so long to reach internal thermal equilibrium during annealing that there is substantial surface oxidation if the article is annealed in air or a commercial non-oxidizing gas, and the present approach cannot be used. For some embodiments of the present approach, it has been determined that the article may have a thickness of no greater than about 1 inch, and preferably no more than about ½ inch, for typical materials.

The present approach allows the manufacturing of operable articles to be established as a semi-continuous-flow manufacturing cell, where all of the metalworking and annealing apparatus are conveniently located together. Smaller, lower-cost atmospheric-pressure annealing apparatus may be used as compared with large-batch vacuum annealing apparatus, and the annealing apparatus may be dedicated to the single function so that it is fully utilized. The manufacturing cell further improves the manufacturing efficiency and reduces costs, by reducing the time spent in transporting articles between various locations and the waiting time. Problems in the manufacturing operation are discovered quickly, allowing corrections to be made before a large number of in-process articles are damaged. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figures 1, 2:
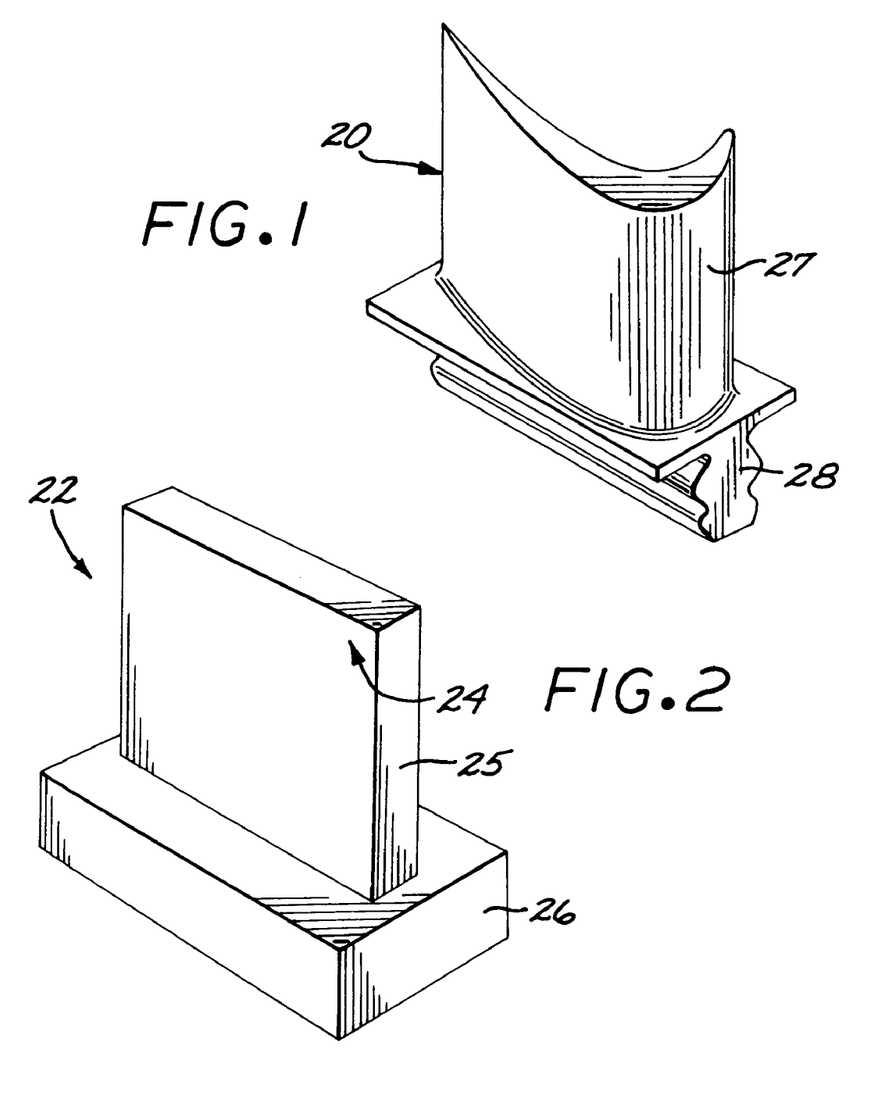
FIG. 1 is a perspective view of an article processed by the present approach.
FIG. 2 is a perspective view of a starting workpiece that is used to make the article of FIG. 1.

FIG. 1 depicts an example of an article 20 that may be manufactured by the present approach. In this case, the article is a component of a gas turbine, and specifically a high-pressure compressor blade. Other examples include a gas turbine compressor vane and a gas turbine compressor-vane ring. A plurality of the articles 20 are manufactured from a plurality of metallic-alloy workpieces that provide the starting point for the present processing. FIG. 2 illustrates a starting workpiece 22 for the compressor-blade article 20 of FIG. 1. In one manufacturing approach, the starting workpiece 22 is first forged from a cylindrical slug 29, illustrated in FIG. 3, to generally define a relatively thin airfoil-precursor region 25 and a more massive dovetail/platform-precursor region 26. The airfoil-precursor region 25 is subsequently metalworked and annealed, by steps of rolling and intermediate annealing in this case, to form a final airfoil 27 of the high-pressure compressor blade article of FIG. 1. The dovetail/platform-precursor region 26 is formed to the final shape of a dovetail/platform 28 by processes that are not described herein, but can include rolling, machining, and other procedures. Each particular type of article has its own type of starting workpiece and manufacturing sequence. The articles mentioned here are examples of most interest, but the use of the present invention is not so limited.

Figure 4:
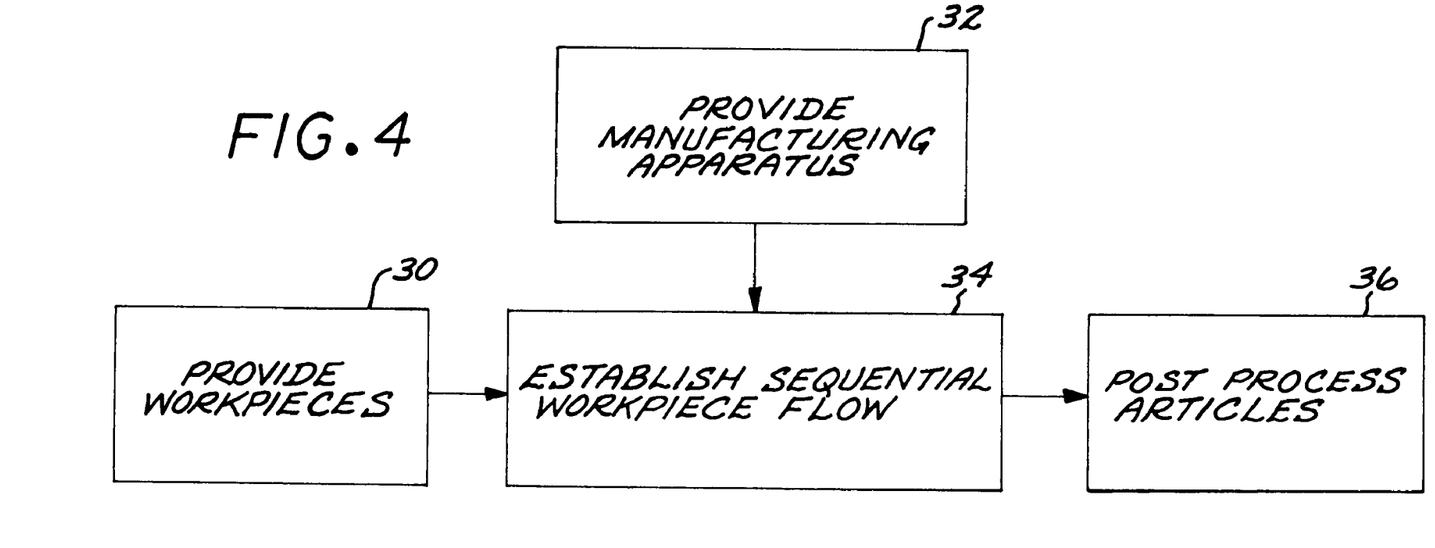
FIG. 4 is a block flow diagram of an approach for practicing the invention.

FIG. 4 is a block flow diagram of a preferred approach for practicing the present invention. A plurality of starting workpieces are provided, numeral 30. The workpieces are substantially identical and are selected according to the nature of the final article that is to be manufactured.

Various materials are operable as the material of construction of the workpieces. The operable materials may be specified in any of several ways, for example.

Operable materials may be described according to their compositions. Thus, for example, the materials of most interest include nickel-base alloys such as Alloy 718, having a nominal composition, in weight percent, of about 52.5 percent nickel, about 18.35 percent iron, about 19 percent chromium, about 5.3 percent niobium, about 3.05 percent molybdenum, about 0.9 percent titanium, about 0.5 percent aluminum, and about 0.4 percent cobalt, with the balance minor elements; the nickel-base Alloy 600; and iron-base alloys such as A286.

In another approach, the workpiece material may be described empirically in terms of its annealing requirements, oxidation properties, and possibly other parameters. For example, the workpiece may be made of a workpiece material that requires post-metalworking annealing at a annealing temperature of at least about $T_A$ (e.g., about 1750° F. for a case of interest). However, if the workpiece is heated to a temperature of more than about $T_A$ for a time of greater than about $t_{air,max}$ (e.g., about 1 hour for a case of interest) in air or even a commercial-quality non-oxidizing gas, it is unacceptably oxidized so as to be rendered inoperable for metalworking. This workpiece material would necessarily be heat treated in a vacuum furnace in most large-batch annealing processes, because the time required for the batch heat treatment would necessarily be more than $t_{air,max}$ to allow equilibration of all of the pieces in the batch heat treatment.

The selection of operable workpieces for the present approach may also be governed in part by the physical configuration of the workpiece. If the workpiece is too thick, the central portions cannot reach $T_A$ in an acceptably short time to forestall surface oxidation. Thus, the operable workpieces have a metalworking region 24 (in FIG. 2) that has a maximum thickness in its smallest dimension of no greater than about $d_S$. Preferably, $d_S$ is not greater than about 1 inch, and more preferably not greater than about ½ inch. If the thickness of the metalworking region 24 is more than about 1 inch, or ½ inch for the preferred case, for typical metals the thermal diffusion does not permit the heating of the central portions of the workpiece to the required annealing temperature in a sufficiently short time when commercially practical heating techniques are used.

Figure 5:
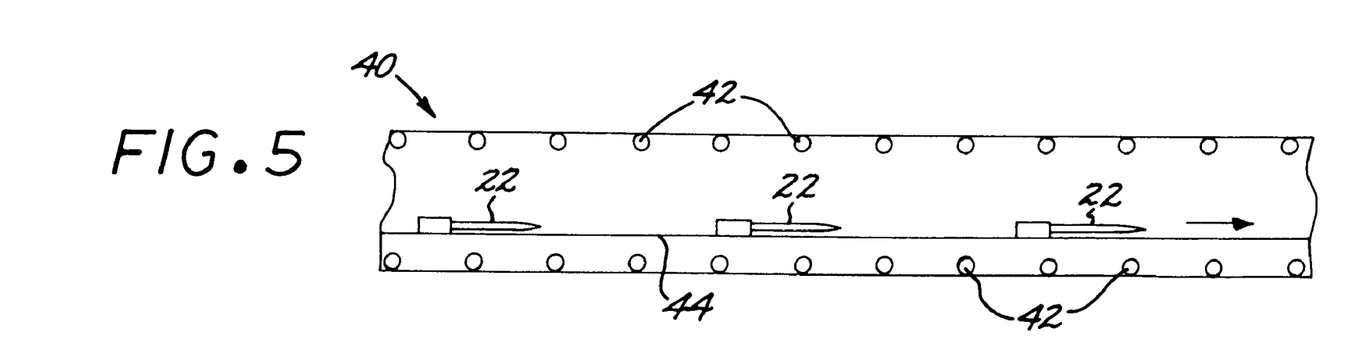
FIG. 5 is schematic view of an annealing apparatus.

A manufacturing apparatus is provided, numeral 32. The manufacturing apparatus includes a metalworking apparatus, preferably a rolling mill such as a pinch-rolling mill, a through-rolling mill, or a ring-rolling mill, and an annealing apparatus wherein each individual workpiece is annealed by single-workpiece annealing and not by large-batch annealing. (In a pinch-rolling mill, the workpiece does not pass all the way through the rolling mill; in a through-rolling mill the article does pass entirely through the rolling mill; and in a ring-rolling mill the ring is inserted from the side into the rolling mill and is rolled generally circularly in a continuous manner.) In single-workpiece annealing, each workpiece is heated as though it were the only workpiece present, typically substantially at a rate determined by the heat input rate from the heat source, its surface heat transfer rate, and the thermal diffusivity of the metal, not by its position relative to another workpiece and not by its position relative to another workpiece in an oven. FIG. 5 schematically depicts a suitable form of an annealing apparatus 40. The annealing apparatus 40 includes any operable type of heaters 42. In the illustrated preferred case, a plurality of silicon carbide electrical resistive-radiative heating elements heated by passage of an electrical current therethrough are positioned to radiatively heat the workpieces 22 as they pass by the heaters on a conveyer. Other types of heating such as induction heating, heat lamps, electrical-resistance heating of the workpieces themselves by passing an electrical current through them, and infrared heating may be used instead or additionally, in any combination. The heaters 42 are typically arranged and or powered to define a heating zone, a heat-maintenance zone, and a cooldown zone through which the workpieces progressively pass.

The workpieces 22 rest upon a support 44 that may be either stationary or moving. In the former, the annealing process is a small-batch annealing process, and in the latter, the annealing is a continuous annealing process. In any case, the individual workpieces 22 are heated substantially at the same rate that they are heated when there is only a single workpiece being directly heated by the arrangement of heaters 42. The use of a conveyer-belt-type continuous-movement or controlled-movement support 44 is preferred, with the rate of movement and the length of the heating zones being selected to provide exactly the right amount of time to heat the workpiece to the annealing temperature and maintain it at the annealing temperature for the required time, without operator supervision or chance of operator error.

The atmosphere in the annealing apparatus 40 may be air, a nonoxidizing gas such as nitrogen, helium, or argon, or a vacuum. Where the atmosphere is air or a nonoxidizing gas, the pressure is preferably substantially one atmosphere so that the workpieces 22 may enter and leave the annealing apparatus 40 without passing through a lock. As used herein, "one atmosphere" pressure or "atmospheric pressure" includes the case of no pressure difference between the interior of the annealing apparatus 40 and the exterior, and the case of a slight positive pressure in the annealing apparatus 40 in the case of the nonoxidizing gas, so that the outside air does not flow into the annealing apparatus. The use of a vacuum oven is permitted but not preferred, because of its high cost and long cycle time.

Figure 6:
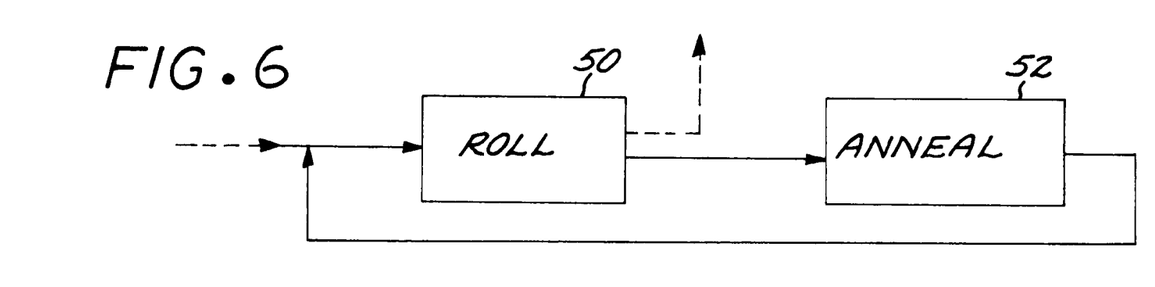
FIGS. 6–8 are schematic illustrations of examples of operable subapparatus arrangements that may be used to implement the present approach.
Figure 7:
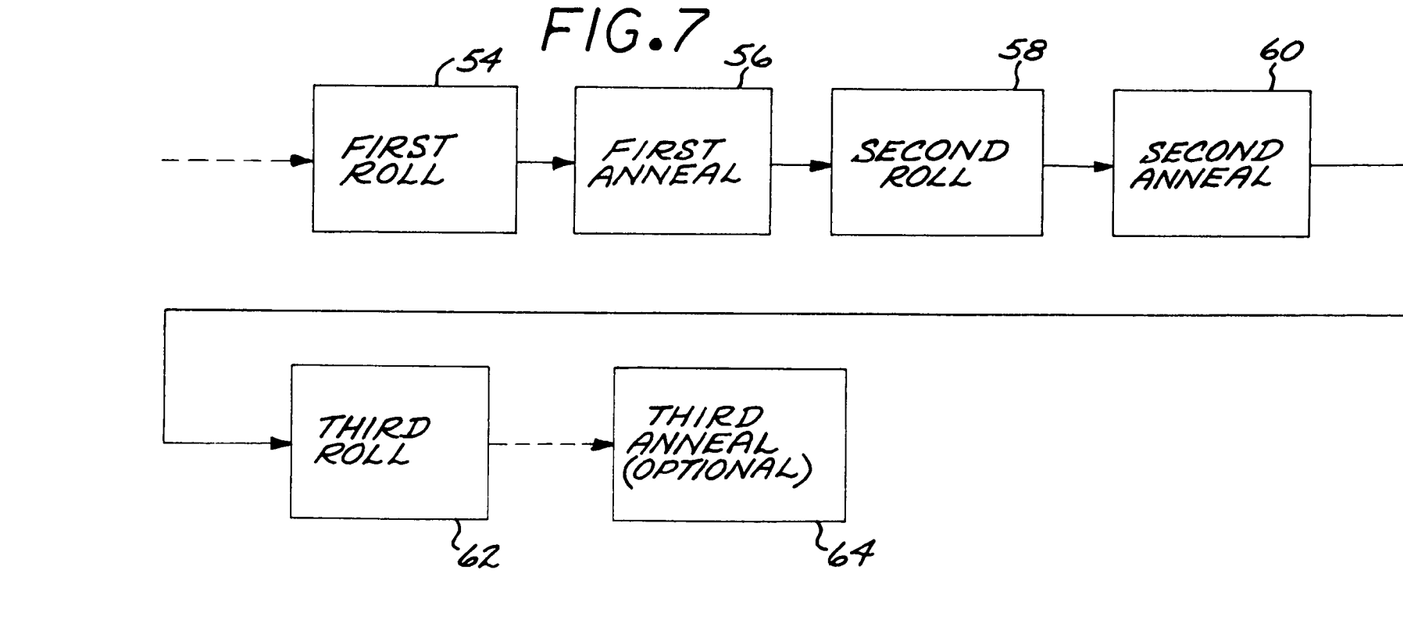
Figure 8:
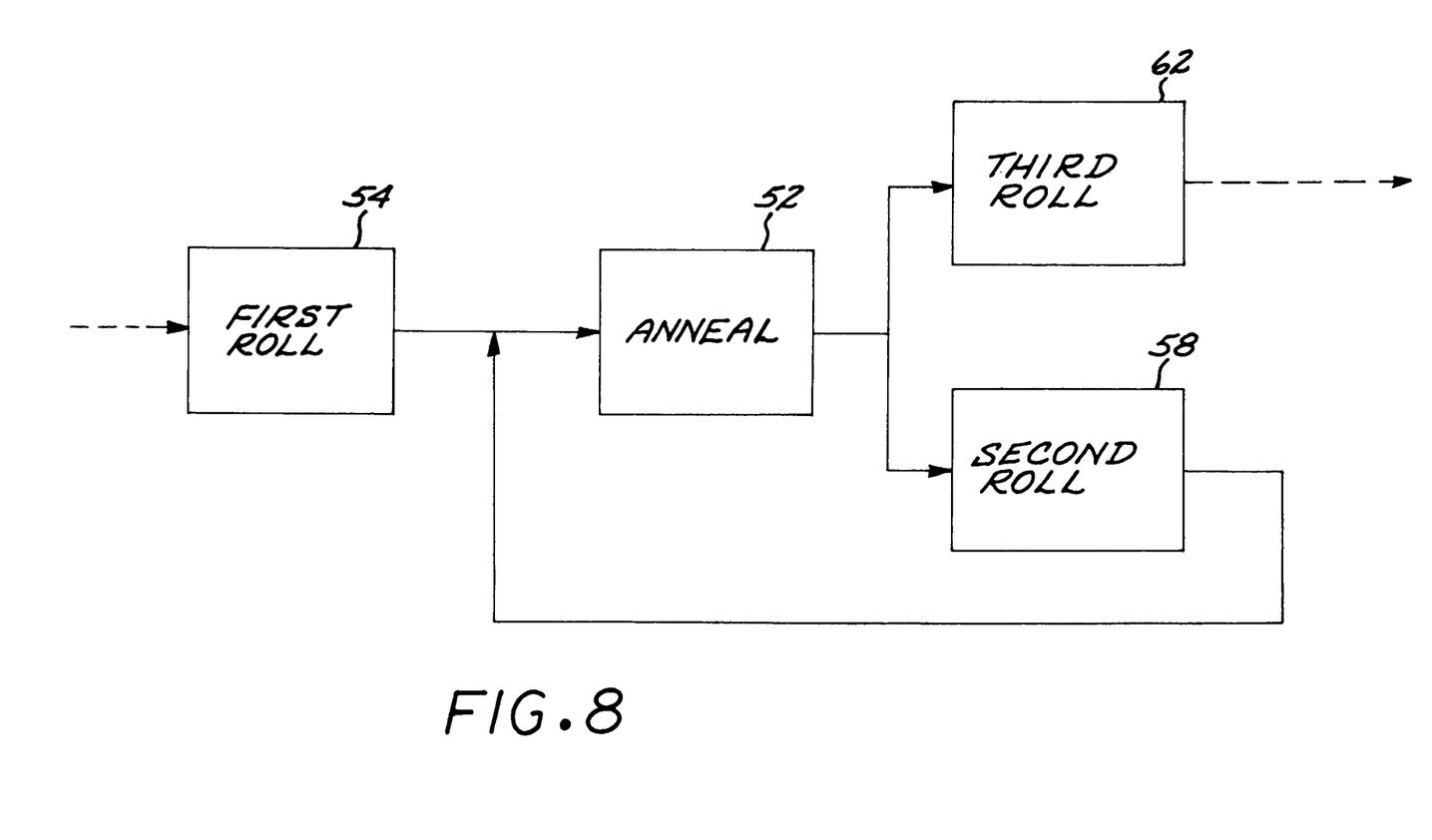

A workpiece flow of the plurality of workpieces is established sequentially through the metalworking apparatus and the annealing apparatus, step 34. Several types of arrangements of the manufacturing apparatus are of interest and are illustrated in FIGS. 6–8. In the arrangement of FIG. 6, there is a single metalworking apparatus, here illustrated as a single rolling apparatus 50 and a single annealing apparatus 52. Workpieces are first rolled in the rolling apparatus 50, annealed in the annealing apparatus 52, and then second rolled in the same rolling apparatus 50 that is adjusted to different rolling thicknesses and other parameters for the second rolling. In the preferred approaches of FIGS. 6–8, all of the rolling operations are performed substantially at room temperature, but other rolling temperatures may be used if desired. It also may be necessary to adjust the annealing apparatus 52 between passes of the workpieces.

In another approach illustrated in FIG. 7, there are a first rolling subapparatus 54, a first annealing subapparatus 56, a second rolling subapparatus 58, a second annealing subapparatus 60, and a third rolling subapparatus 62. There may optionally be a third annealing subapparatus 64. The workpieces flow sequentially through the first rolling subapparatus 54, the first annealing subapparatus 56, the second rolling subapparatus 58, the second annealing subapparatus 60, the third rolling subapparatus 62, and the third annealing subapparatus 64 (if used). Each of the subapparatus 54, 56, 58, 60, 62, and 64 (if used) need not be adjusted between passes.

Another approach illustrated in FIG. 8 is a hybrid of the fully recirculating approach of FIG. 6 and the straight-through approach of FIG. 7. In this embodiment, there are three rolling apparatus 54, 58, and 62, but only a single annealing apparatus 52. The workpieces flow sequently through apparatus 54, 52, 58, 52, and 62, passing through the same annealing apparatus 52 two (or three) times.

The selection of the arrangement of the metalworking apparatus and the annealing apparatus depends upon the specific circumstances and the article being manufactured. Any one of the arrangements of FIGS. 6–8, or other types of arrangements may be used. Of course, there may be additional stages of metalworking subapparatus and annealing subapparatus as needed. There may also be additional process steps inserted between those illustrated, such as cleaning steps. In any of the processes of FIGS. 6–8, or others within the scope of the present approach, the number of actual pieces of apparatus may be varied to optimize the process. For example, if in the approach of FIG. 7 a single rolling mill used in the second rolling step 58 takes twice as long to perform its function as does the annealing apparatus, then two of the rolling mills may be provided for step 58 to minimize the waiting time of workpieces. Alternatively, the size of the annealing apparatus may be scaled to match the rolling apparatus.

The article 20 may thereafter be post processed, step 36 of FIG. 4. Post processing may be of any operable type, such as further working, machining, heat treating, coating, assembling and joining, and the like. However, it is typically not necessary to remove excess material from the metalworking region due to excessive oxidation of that region during the annealing steps.

The present approach is founded upon the recognition that most of the time that the workpiece spends being transported to, waiting for, and actually in a conventional vacuum batch-annealing oven is a result of the batch nature of the annealing. There is waiting time to accumulate enough workpieces for a full or nearly full batch, so that the oven capacity is not wasted. There is further waiting time, after the batch is accumulated, until an oven is available. Most of the time that the workpieces spend in the oven itself is associated with loading, pumping the vacuum, heating the oven and load, waiting for the entire load to equilibrate throughout, cooling the oven and load, and unloading. The actual time required to perform the annealing in a satisfactory manner is relatively small.

An important principle underlying the present approach is that many alloys need be at the annealing temperature for only a short time in order to achieve sufficient annealing and softening to permit further metalworking. The required time-at-annealing-temperature is determined by the material being annealed, the degree of working prior to the annealing, and the temperature of annealing. For moderately cold-worked materials such as Alloy 718 annealed at a typical annealing temperature of about 1750° F., the required time-at-annealing temperature is less than about 2 minutes, and often less than about 30 seconds. Even for less cold working prior to annealing, the required time-at-annealing temperature is usually less than about 5 minutes.

The time that the article must be in the annealing apparatus is distinct from the time-at-annealing-temperature. The time that the article must be in the annealing apparatus is determined by the required time-at-annealing-temperature, but also the thermal properties of the article, the configuration of the article (most significantly its thickness), the heating rate as determined by the efficiency of the heating apparatus and the nature of the heat transfer to the article, and additionally the packing (or lack thereof) of the articles in the annealing apparatus. When the articles are packed together, as in baskets, for large-batch annealing, the time for the articles buried in the mass of articles to reach the annealing temperature is usually quite long, as compared with the time required for the outermost articles that are directly exposed to the heaters to reach the annealing temperature. The time that the article is in the annealing oven is typically several hours for each annealing cycle to ensure that all of the articles reach the annealing temperature and are maintained there for only a few minutes. The outermost articles reach the annealing temperature much faster than do the innermost articles, so that oxidation of the outermost articles is of concern. As a result, it is necessary to do the heat treatment in vacuum because even nominally pure commercial-grade nitrogen or argon cover gases have sufficient oxygen impurity that unacceptable oxidation of the article would result in several hours in the annealing apparatus.

In the present approach, "single-workpiece annealing" is used so that each workpiece (i.e., article) is heated in a manner and at a heating rate as though it were the only workpiece present. Consequently, the heating time is the same for every workpiece. No allowance need be made for different heating rates of articles in the center and near the edge of a mass of articles, as is the case for large-batch annealing. The most commercially efficient way of performing this single-workpiece annealing is to place the workpieces on a conveyer that passes through an annealing oven having heaters that provide the desired heating. A configuration of the heaters defining a heating zone, a heat-maintenance zone, and a cooldown zone has been found most effective. This design allows the article to be maintained in the furnace for no more than about 30 minutes, more preferably no more than about 15 minutes, and most preferably no more than about 10 minutes, for each annealing cycle.

The ability to achieve annealing in a short time in air or a commercial inert gas would not be useful unless the workpieces were sufficiently resistant to oxidation that they did not excessively oxidize in the time required to heat the workpiece and then to anneal it. Studies have determined that, in the time required for heating and annealing using the present approach, the minor amount of oxidation in air or commercial-grade nitrogen is not sufficient to prevent operability of the workpiece in further rolling. Consequently, it has been possible to perform the annealing in air or a commercial-grade cover gas, such as nitrogen or argon, at substantially atmospheric pressure, and to avoid the need to use a vacuum furnace.

Figure 3:
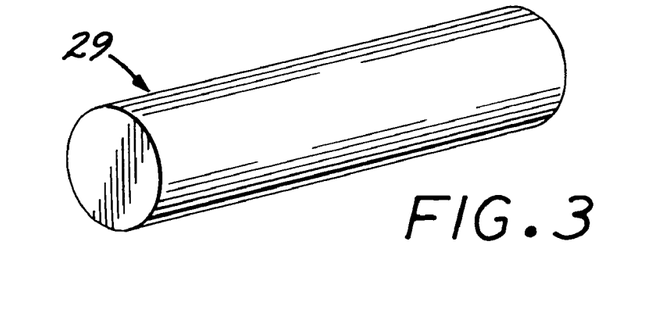
FIG. 3 is a perspective view of a cylindrical slug from which the starting workpiece is forged.

The present approach has been reduced to practice by preparing prototype pinch-rolled compressor blades with integral dovetails, through-rolled compressor vanes, and ring-rolled compressor-vane rings. The manufacturing sequence for the pinch-rolled compressor blades was that a cylindrical slug 29 of the required composition (Alloy 718 in the reductions to practice) as shown in FIG. 3 was forged to form the starting workpiece as shown in FIG. 2. The airfoil section of the compressor blade was then pinch rolled in 5 progressive increments to form the completed compressor blade of FIG. 1. The starting workpieces were single-workpiece annealed in commercial-grade nitrogen at about 1750° F. prior to the commencement of the pinch rolling, and between each of the progressive increments of the pinch rolling process. The manufacturing sequence for the compressor vanes and the compressor-vane rings started with flat strip material or rings, respectively, of the required composition (Alloy 718 in the reductions to practice), which was then through rolled in progressive increments to form the compressor vane or ring rolled to form the compressor-vane ring. The progressively deformed material was annealed in air at about 1750° F. between each of the progressive increments of the through-rolling process. The compressor vanes are essentially flat, except for the curvature of the airfoil, and the compressor-vane rings are annular and subsequently segmented to form a cylindrical compressor-vane ring structure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for manufacturing a plurality of articles from a plurality of metallic-alloy workpieces, comprising the steps of
    providing a plurality of workpieces, wherein the workpieces are substantially identical and are made of a workpiece material that requires post-metalworking annealing at an annealing temperature;
    providing a manufacturing apparatus comprising
        a metalworking apparatus, and
        an annealing apparatus wherein each workpiece is annealed by single-workpiece annealing in air and not by large-batch annealing;
    establishing a workpiece flow of the plurality of workpieces sequentially through the metalworking apparatus and the annealing apparatus, wherein
        the workpieces are worked in a metalworking region in the metalworking apparatus, and thereafter
        the workpieces are held at the annealing temperature in the annealing apparatus for a time of not greater than about 5 minutes.

2. The method of claim 1, wherein the step of providing the manufacturing apparatus includes the step of
    providing the metalworking apparatus to perform metalworking at substantially room temperature.

3. The method of claim 1, wherein the step of providing includes the step of
    providing the workpieces having a maximum thickness in the metalworking region of not greater than about 1 inch.

4. The method of claim 1, wherein the step of providing includes the step of
    providing the workpieces selected from the group consisting of a gas turbine compressor blade workpiece, a gas turbine compressor vane workpiece, and a gas turbine compressor vane-ring workpiece.

5. The method of claim 1, wherein the step of providing the manufacturing apparatus includes the step of
    providing the annealing apparatus wherein the workpieces are annealed at substantially atmospheric pressure.

6. The method of claim 1, wherein the step of providing the plurality of workpieces includes the step of
    providing the plurality of workpieces made of the workpiece material that, if heated to the annealing temperature for a time of greater than about 1 hour in air, is unacceptably oxidized so as to be rendered inoperable for metalworking.

7. The method of claim 1, wherein the step of providing the manufacturing apparatus includes the step of
    providing the annealing apparatus wherein each workpiece is heated to the annealing temperature for a time of no more than about 2 minutes.

8. The method of claim 1, wherein the step of providing the manufacturing apparatus includes the step of
    providing the annealing apparatus wherein each workpiece remains in the annealing apparatus for a time of no more than about 30 minutes.

9. The method of claim 1, wherein the step of providing the manufacturing apparatus includes the step of
    providing the manufacturing apparatus having
        a first metalworking subapparatus,
        a first annealing subapparatus, and
        a second metalworking subapparatus, and wherein the step of establishing includes the step of
    establishing the workpiece flow sequentially through the first metalworking subapparatus, thereafter through the first annealing subapparatus, and thereafter through the second metalworking subapparatus.

10. The method of claim 1, wherein the step of providing the manufacturing apparatus includes the step of
    providing the manufacturing apparatus having
        a first metalworking subapparatus,
        a first annealing subapparatus,
        a second metalworking subapparatus,
        a second annealing subapparatus, and
        a third metalworking subapparatus, and wherein the step of establishing includes the step of
    establishing the workpiece flow sequentially through the first metalworking subapparatus, thereafter through the first annealing subapparatus, thereafter through the second metalworking subapparatus, thereafter through the second annealing subapparatus, and thereafter through the third metalworking subapparatus.

11. The method of claim 1, wherein the step of providing the manufacturing apparatus includes the step of providing the metalworking apparatus as a rolling apparatus.

12. A method for manufacturing a plurality of articles from a plurality of metallic-alloy workpieces, comprising the steps of providing a plurality of workpieces, wherein the workpieces are substantially identical and have a metalworking region that has a thickness of not greater than about 1 inch;

providing a manufacturing apparatus comprising a metalworking apparatus operable to work the metalworking region of the workpieces at substantially room temperature, and an annealing apparatus wherein each individual workpiece is annealed by single-workpiece annealing in air and not by large-batch annealing;

establishing a workpiece flow of the plurality of workpieces sequentially through the metalworking apparatus and the annealing apparatus.

13. A method for manufacturing a plurality of gas turbine component articles from a plurality of metallic-alloy workpieces, comprising the steps of providing a plurality of workpieces, wherein the workpieces are substantially identical and are selected from the group consisting of a gas turbine compressor blade workpiece, a gas turbine compressor vane workpiece, and a gas turbine compressor vane-ring workpiece, and wherein the workpieces are made of a nickel-base alloy;

providing a manufacturing apparatus comprising a metalworking apparatus that works the workpieces at substantially room temperature, and an annealing apparatus wherein each individual workpiece is annealed by single-workpiece annealing in air and not by large-batch annealing;

establishing a workpiece flow of the plurality of workpieces sequentially through the metalworking apparatus and the annealing apparatus.

14. The method of claim 13, wherein the step of providing the manufacturing apparatus includes the step of providing the annealing apparatus wherein the workpieces are annealed at substantially atmospheric pressure.

15. The method of claim 13, wherein the step of providing the manufacturing apparatus includes the step of providing the annealing apparatus wherein each workpiece is heated to an annealing temperature in a time that is no greater than a time required to heat a single workpiece to the annealing temperature.

16. The method of claim 13, wherein the step of providing the manufacturing apparatus includes the step of providing the annealing apparatus wherein each workpiece is heated to an annealing temperature for a time of no more than about 2 minutes.

17. The method of claim 13, wherein the step of providing the manufacturing apparatus includes the step of providing the annealing apparatus wherein each workpiece remains in the annealing apparatus for a time of not greater than about 30 minutes.

18. The method of claim 13, wherein the step of providing the manufacturing apparatus includes the step of providing the manufacturing apparatus having a first metalworking subapparatus, a first annealing subapparatus, and a second metalworking subapparatus, and wherein the step of establishing includes the step of establishing the workpiece flow sequentially through the first metalworking subapparatus, thereafter through the first annealing subapparatus, and thereafter through the second metalworking subapparatus.

19. The method of claim 13, wherein the step of providing the manufacturing apparatus includes the step of providing the manufacturing apparatus having a first metalworking subapparatus, a first annealing subapparatus, a second metalworking subapparatus, a second annealing subapparatus, and a third metalworking subapparatus, and wherein the step of establishing includes the step of establishing the workpiece flow sequentially through the first metalworking subapparatus, thereafter through the first annealing subapparatus, thereafter through the second metalworking subapparatus, thereafter through the second annealing subapparatus, and thereafter through the third metalworking subapparatus.

20. The method of claim 13, wherein the step of providing the manufacturing apparatus includes the step of providing the metalworking apparatus as a rolling apparatus.

21. The method of claim 1, wherein the step of providing the plurality of workpieces includes the step of providing the workpieces wherein each workpiece is made of a nickel-base alloy.

22. The method of claim 1, wherein the step of providing includes the step of providing the plurality of workpieces, wherein the workpieces require post-metalworking annealing at an annealing temperature of at least about 1700° F.

23. The method of claim 12, wherein the step of providing the plurality of workpieces includes the step of providing the workpieces wherein each workpiece is made of a nickel-base alloy.

* * * * *

UNITED STATES PATENT AND TRADEMARK OFFICE
CERTIFICATE OF CORRECTION

PATENT NO. : 7,198,684 B2  Page 1 of 1
APPLICATION NO. : 10/388671
DATED : April 3, 2007
INVENTOR(S) : Broderick et al.

It is certified that error appears in the above-identified patent and that said Letters Patent is hereby corrected as shown below:

On the Title page, Field 75, Inventors, "West Chester, OH (US)" should be -- Middletown, OH (US) -- and "Harnstead, NH" should be -- Barnstead, NH --

Signed and Sealed this

Fourteenth Day of August, 2007

JON W. DUDAS
*Director of the United States Patent and Trademark Office*